United States Patent [19]

Takahashi et al.

[11] Patent Number: 5,336,735

[45] Date of Patent: Aug. 9, 1994

[54] FLAME-RETARDANT THERMOPLASTIC RESIN COMPOSITION, FLAME RETARDANT, AND PROCESS FOR PREPARING THE FLAME RETARDANT

[75] Inventors: Katsuji Takahashi; Yuji Sath; Takehisa Mizuno, all of Chiba, Japan

[73] Assignee: Dainippon Ink and Chemicals, Inc., Tokyo, Japan

[21] Appl. No.: 944,004

[22] Filed: Sep. 14, 1992

Related U.S. Application Data

[62] Division of Ser. No. 853,594, Mar. 18, 1992, abandoned.

[30] Foreign Application Priority Data

Mar. 19, 1991 [JP] Japan .................. 3-054614
May 31, 1991 [JP] Japan .................. 3-129421

[51] Int. Cl.$^5$ .............................. C08L 63/10
[52] U.S. Cl. ....................... 525/423; 525/122; 525/396; 525/438; 525/449; 525/463; 525/524; 525/531; 525/533; 523/438; 523/516; 524/114
[58] Field of Search ........... 525/122, 531, 524, 396, 525/533, 423, 438, 449, 463; 524/114; 523/438, 516

[56] References Cited

U.S. PATENT DOCUMENTS

| | | | |
|---|---|---|---|
| 3,909,485 | 9/1975 | Hongo et al. | 525/438 |
| 3,965,212 | 6/1976 | Kamada et al. | 525/438 |
| 4,179,440 | 12/1979 | Martinez | 523/404 |
| 4,562,216 | 12/1985 | Kishida et al. | 525/438 |
| 4,732,921 | 3/1988 | Hochberg et al. | 523/460 |
| 4,783,509 | 11/1988 | Cavitt et al. | 525/527 |
| 5,057,556 | 10/1991 | Redman | 523/404 |

*Primary Examiner*—John C. Bleutge
*Assistant Examiner*—Randy Gulakowski
*Attorney, Agent, or Firm*—Armstrong, Westerman, Hattori, McLeland & Naughton

[57] ABSTRACT

A flame-retardant thermoplastic resin composition is disclosed, comprising (A) a thermoplastic resin and (B-1) a halogenated epoxy resin whose epoxy groups are blocked by a long chain aliphatic carboxylic acid or (B-2) a mixture prepared by melt mixing (b1) a halogenated epoxy resin or (b2) a halogenated epoxy resin whose epoxy groups are blocked with (b3) a long chain aliphatic carboxylic acid. The composition has easy release from mold and satisfactory thermal stability during molding.

7 Claims, No Drawings

FLAME-RETARDANT THERMOPLASTIC RESIN COMPOSITION, FLAME RETARDANT, AND PROCESS FOR PREPARING THE FLAME RETARDANT

This application is a division of application Ser. No. 07/853,594 filed Mar. 18, 1992 now abandoned.

FIELD OF THE INVENTION

This invention relates to a flame-retardant thermoplastic resin composition excellent in mold releasability and thermal stability during molding and to a flame retardant which endows thermoplastic resins with satisfactory mold releasability and satisfactory thermal stability.

BACKGROUND OF THE INVENTION

Known flame-retardant thermoplastic resin compositions or flame retardants therefor include, for example, a flame-retardant resin composition containing a halogenated epoxy resin as a flame retardant as disclosed in JP-A-53-74557, JP-A54-91557, JP-B-60-264313, and JP-A-62-15256 (the term"JP-A" as used herein means an "unexamined published Japanese patent application", and the term "JP-B" as used herein means an "examined Japanese patent publication"); a flame-retardant resin composition further containing a flame-retardant assistant, e.g., antimony trioxide, as disclosed in JP-A-62-15256; a flame retardant comprising an epoxy resin whose epoxy groups are blocked by a halogenated phenol compound, e.g., tribromophenol, as disclosed in JP-A-62-4737; and a flame retardant system comprising a combination of a brominated bisphenol compound, an epoxy compound, and a metallic soap, e.g., calcium stearate.

However, since the conventionally proposed flame retardants have high stickiness to metallic parts of a molding machine or a mold, compounding of such flame retardants causes reduction in releasability of a molded article from a mold. Besides, the flame retardant sticking and remaining on the metallic parts undergoes thermal decomposition to cause discoloration or scorching.

It is generally known to improve mold releasability by addition of long chain aliphatic carboxylic acids, e.g., stearic acid, as a release agent. The release agent is usually incorporated by dry blending with resins and flame retardants, followed by melt kneading in an extruder, etc.

However, in using a halogenated epoxy resin as a flame retardant, it has been difficult to obtain a flame-retardant resin composition exhibiting easy release even with the aid of the known release agent. Stick in mold due to a flame retardant is particularly conspicuous with resins requiring high molding temperatures such as polyester resins.

SUMMARY OF THE INVENTION

An object of the present invention is to provide a flame-retardant thermoplastic resin composition which has reduced stickiness to metallic parts of a molding machine or a mold and is therefore excellent in mold releasability and also which exhibits excellent thermal stability during molding and therefore undergoes no deterioration in surface appearance due to thermal decomposition of a flame retardant.

Another object of the present invention is to provide a flame retardant which has reduced stickiness to metallic parts of a molding machine or a mold and which does not readily decompose on heating.

A further object of the present invention is to provide a process for preparing such a flame retardant.

As a result of extensive investigations, the inventors have found that (B-1) a halogenated epoxy resin whose epoxy groups are blocked by a long chain aliphatic carboxylic acid or (B-2) a mixture prepared by melt mixing (b1) a halogenated epoxy resin or (b2) a halogenated epoxy resin whose epoxy groups are blocked with (b3) a long chain aliphatic carboxylic acid, e.g., stearic acid, endows a thermoplastic resin composition with flame retardance while assuring easy release and thermal stability during molding.

The present invention provides a flame-retardant thermoplastic resin composition comprising (A) a thermoplastic resin and, as a flame retardant, (B-1) a halogenated epoxy resin whose epoxy groups are blocked by a long chain aliphatic carboxylic acid or (B-2) a mixture prepared by melt mixing (b1) a halogenated epoxy resin or (b2) a halogenated epoxy resin whose epoxy groups are blocked with (b3) a long chain aliphatic carboxylic acid.

The present invention further provides a flame retardant comprising a halogenated epoxy resin whose epoxy groups are blocked by a long chain aliphatic carboxylic acid.

The present invention furthermore provides a process for preparing a flame retardant comprising reacting a halogenated epoxy resin with a halogenated bisphenol compound and a long chain aliphatic carboxylic acid by heating or reacting a halogenated epoxy resin with a halogenated bisphenol compound, a halogenated phenol compound, and a long chain aliphatic carboxylic acid by heating.

DETAILED DESCRIPTION OF THE INVENTION

The halogenated epoxy resin which can be used in the present invention is not particularly limited and includes halogenated bisphenol type epoxy resins, halogenated phenol novolac type epoxy resins, halogenated cresol novolac type epoxy resins, halogenated resorcin type epoxy resins, halogenated hydroquinone type epoxy resins, halogenated bisphenol A novolac type epoxy resins, halogenated methylresorcin type epoxy resins, and halogenated resorcin novolac type epoxy resins. Among them, halogenated bisphenol type epoxy resins having an average degree of polymerization of from 0 to about 50 are usually used.

Examples of halogenated bisphenol compounds constituting the halogenated bisphenol type epoxy resins are dibromobisphenol A, tetrabromobisphenol A, dichlorobisphenol A, tetrachlorobisphenol A, dibromobisphenol F, tetrabromobisphenol F, dichlorobisphenol F, tetrachlorobisphenol F, dibromobisphenol S, tetrabromobisphenol S, dichlorobisphenol S, and tetrachlorobisphenol S.

The long chain aliphatic carboxylic acid used in the present invention is an essential component for reducing stickiness of a halogenated epoxy resin to metallic parts thereby imparting improved releasability.

Long chain aliphatic carboxylic acids to be used preferably have 8 or more carbon atoms, and particularly from 10 to 30 carbon atoms, and include alkanoic acids and alkenylmonocarboxylic acids. Specific examples of suitable long chain aliphatic carboxylic acids are heptanoic acid, capric acid, lauric acid, myristic acid, isomyristic acid, palmitic acid, isopalmitic acid, stearic acid, isostearic acid, oleic acid, eicosanoic acid, behenic acid, melissic acid, and montanic acid. These aliphatic monocarboxylic acids may have a part or the whole of the hydrogen atoms thereof substituted with a halogen atom.

For blocking the epoxy groups of a halogenated epoxy resin, a halogenated phenol compound may be used in combination with the above-described long chain aliphatic carboxylic acid. Examples of suitable halogenated phenol compounds are dibromophenol, dibromocresol, tribromophenol, pentabromophenol, dichlorophenol, dichlorocresol, trichlorophenol, and pentachlorophenol.

The halogenated epoxy resin whose epoxy groups are blocked by a long chain aliphatic carboxylic acid, component (B-1), can be obtained through various processes, known or novel.

For example, component (B-1) can be obtained by (1) a process comprising addition reacting a halogenated bisphenol compound to a halogenated epoxy resin and reacting the adduct with a long chain aliphatic carboxylic acid or a combination of a long chain aliphatic carboxylic acid and a halogenated phenol compound or (2) a process comprising reacting a halogenated epoxy resin with a halogenated bisphenol compound and a long chain aliphatic carboxylic acid by heating or with a halogenated bisphenol compound, a halogenated phenol compound, and a long chain aliphatic carboxylic acid by heating.

In more detail, process (1), a known process, comprises addition reacting a halogenated bisphenol compound to a halogenated epoxy resin and reacting the adduct with a long chain aliphatic carboxylic acid or a combination of a long chain aliphatic carboxylic acid and a halogenated phenol compound in the presence or absence of a catalyst by heating at a temperature of from 100° to 230° C. Process (2), which is a novel process developed by the inventors, comprises reacting a halogenated epoxy resin with (i) a halogenated bisphenol compound and (ii) a long chain aliphatic carboxylic acid in the presence or absence of a catalyst by heating at 100° to 230° C. or with (iii) a halogenated phenol compound, (iv) a halogenated bisphenol compound, and (v) a long chain aliphatic carboxylic acid in the presence or absence of a catalyst by heating at 100° to 230° C.

Catalysts which can be used in the above-described reactions include alkali metal hydroxides, e.g., sodium hydroxide, tertiary amines, e.g., dimethylbenzylamine, imidazoles, e.g., 2-ethyl-4-methylimidazole, quaternary ammoniumsalts, e.g., tetramethylammoniumchloride, phosphonium salts, e.g., ethyltriphenylphosphoniumiodide, and phosphines, e.g., triphenylphosphine.

A reaction solvent is not particularly necessary.

While not limiting, the long chain aliphatic carboxylic acid is used preferably in such an amount that the number of the carboxylic groups be equal to or less than the number of the remaining epoxy groups of the halogenated epoxy resin. From the standpoint of mold release, thermal stability during molding, and heat distortion temperature, the amount of the long chain aliphatic carboxylic acid preferably ranges from 0.05 to 15% by weight based on the sum of the halogenated epoxy resin and the long chain aliphatic carboxylic acid. Amounts exceeding 15% by weight are permissible but produce no further improving effects.

Process (2) according to the present invention is preferable to process (1) in view of the short step involved.

Component (B-2) which can be used in the present invention is a mixture obtained by melt mixing (b1) a halogenated epoxy resin or (b2) a halogenated epoxy resin whose epoxy groups are blocked with (b3) a long chain aliphatic carboxylic acid.

Examples of the halogenated epoxy resin and long chain aliphatic carboxylic acid to be used in component (B-2) include those enumerated with respect to component (B-1). Compounds to be used for blocking the epoxy groups of the halogenated epoxy resin are not particularly limited and include the halogenated phenol compounds and long chain aliphatic carboxylic acids as used in component (B-1).

Component (B-2) can be prepared by, for example, mixing (b1) a halogenated epoxy resin or (b2) a halogenated epoxy resin whose epoxy groups are blocked with (b3) a long chain aliphatic carboxylic acid by heating at a temperature at which both of them are melted, e.g., 120° to 230° C. Mixing can be carried out in any of mixing machines suitable for heating. Usually, the mixture is heated in a container equipped with a stirring blade while stirring for a period of from about 15 minutes to about 3 hours. If necessary, a Banbury mixer, an extruder and so on may be employed.

The amounts of the halogenated epoxy resin (b1), the halogenated epoxy resin whose epoxy groups are blocked (b2), and the long chain aliphatic carboxylic acid (b3) are not particularly limited. From the standpoint of mold release, thermal stability during molding, and heat distortion temperature, it is recommended to use from 85 to 99.95% by weight of the halogenated epoxy resin (b1) or (b2) and from 0.05 to 15% by weight of the long chain aliphatic carboxylic acid (b3), each based on the sum of them. The long chain aliphatic carboxylic acid may be used in amounts exceeding 15% by weight, but no further improving effects result.

The thermoplastic resin which can be used in the present invention include polyolefin resins, e.g., polyethylene and polypropylene, polyester resins, e.g., polybutylene terephthalate (PBT) and polyethylene terephthalate (PET), polycarbonate resins, polyamide resins, polyphenylene oxide (PPO) resins, an alloy of polycarbonate resins and polyester resins, and an alloy of polycarbonate resins and polyamide resins.

The flame retardant according to the present invention can be applied to not only the above-described thermoplastic resins but thermosetting resins, such as epoxy resins, phenolic resins, and polyurethane resins.

When compounded into thermoplastic resins, the flame retardant of the present invention (i.e., component (B-1) or (B-2)) is used in an amount usually of from 1 to 50 parts by weight per 100 parts by weight of the thermoplastic resin. Amounts between 5 and 30 parts by weight are particularly preferred for obtaining high flame retardance and minimizing reductions in physical properties such as impact resistance.

If desired, the resin composition according to the present invention may further contain flame retardant assistants to exhibit increased flame retardance. Examples of useful flame retardant assistants include antimony compounds, e.g., antimony trioxide, antimony tetroxide, and antimony pentoxide; tin compounds, e.g., tin oxide and tin hydroxide; molybdenum compounds, e.g., molybdenum oxide and ammonium molybdate;

zirconium compounds, e.g., zirconium oxide and zirconium hydroxide; and boron compounds, e.g., zinc borate and barium metaborate.

When the flame retardant assistants are added to the resin composition according to the present invention, the content is preferably 0.5 to 10 wt %, and more preferably 2 to 6 wt % from the standpoint of improved flame retardancy and mechanical properties such as impact resistance.

The resin composition may also contain known flame retardants as long as the improving effects on thermal stability during molding and mold releasability during injection molding are not considerably lessened. The resin composition may furthermore contain, if desired, other compounding additives, such as ultraviolet absorbers, light stabilizers, release agents, lubricants, colorants, plasticizers, fillers, blowing agents, heat stabilizers, antioxidants, and reinforcements (e.g., glass fiber, carbon fiber, aramid fiber).

The resin composition can easily be prepared by premixing prescribed amounts of a thermoplastic resin and a flame retardant and, if desired, other compounding additives in a mixing machine, e.g., a Henschel mixer and a tumble mixer, and then melt mixing in an extruder, a kneader, a hot roll, a Banbury mixer, etc.

Having excellent thermal stability on molding and excellent mold releasability, the flame-retardant thermoplastic resin composition according to the present invention affords molded articles of good appearance. The easy release shortens a required molding time, leading to an increase in productivity of molding.

Further, since the flame retardant according to the present invention has reduced stickiness to the metallic parts of a molding machine or a mold and also does not easily decompose under heating, it endows a thermoplastic resin composition with satisfactory thermal stability and mold releasability when compounded therein.

The present invention is now illustrated in greater detail by way of Examples, but it should be understood that the present invention is not construed as being limited thereto. All the percents and parts are by weight unless otherwise indicated.

Physical properties and performance properties of the flame retardants and resin compositions prepared were measured or evaluated as follows.

1) Softening Point:
Measured by ball and ring method according to JIS K-7234.

2) Epoxy Content:
Expressed in terms of a reciprocal (unit: eq/g) of an epoxy equivalent as measured according to JIS K-7236.

3) Heat Distortion Temperature:
Measured according to ASTM D-648 (load: 18.6 kg/cm2).

4) Notched Izod Impact Strength:
Measured on a ¼ in. thick specimen according to ASTM D-256.

5) Flammability:
Evaluated and rated according to UL combustibility rating (UL-94, Underwriters' Laboratories, Inc., Chicago). Five specimens of 5 in. wide, ½ in. long, and 1/8 in. thick were used per sample.

6) Thermal Stability:
A resin compound was repeatedly molded in a 5 oz. injection molding machine under the following conditions to obtain discs having an outer diameter of 100 mm and a thickness of 3 mm. The surface appearance of the resulting discs was inspected both visually and under a magnifier ($\times 10$). The number of the injection molding cycles conducted until discoloration and foreign matter incorporation continuously occurred was taken as an indication of thermal stability. The greater the number of the cycles, the higher the thermal stability. The terminology "discoloration" as used in this test means browning of the entire surface of the disc, and the terminology "foreign matter incorporation" as used in this test means presence of 10 or more foreign matter grains of 1.0 mm$^2$ or greater on one side of the disc.

Injection Molding Conditions:

| Cylinder temperature: | 250–260° C. |
| Injection pressure: | 1400–500 kg/cm$^2$ |
| Mold temperature: | 60° C. |
| Injection time/cooling time: | 10 sec/20 sec |

7) Mold Releasability:
A resin compound was injection molded in a 5 oz. injection molding machine under the following conditions to obtain a box shape having an outside dimension of $200 \times 100 \times 50$ mm and a wall thickness of 5 mm. The maximum load (kg/cm$^2$) imposed on the bottom ejector pin on removal of the molded article from the mold was obtained. The smaller the load, the easier the release. Further, mold releasability was also evaluated from deformation of the resulting molded article according to the following standard.

Good: Easy release with no problem at all.
Medium: Slight stick in mold causing partial deformation of the molded article.
Poor: Considerable stick in mold causing great deformation of the molded article.

The load on the ejector pin was measured by detecting the pressure applied to the ejector pin by means of a pressure sensor provided between an ejector pin plate and a hydraulic cylinder for operating the ejector pin plate.

Injection Molding Conditions:

| Cylinder temperature: | 250–260° C. |
| Injection pressure: | 1400–500 kg/cm$^2$ |
| Mold temperature: | 60° C. |
| Injection time/cooling time: | 10 sec/20 sec |

EXAMPLE 1

In a 1 l separable flask equipped with a thermometer and a stirrer were charged 720.0 g of tetrabromobisphenol A diglycidyl ether ("EPICLON 152" produced by Dainippon Ink and Chemicals, Inc.; epoxy equivalent: 360 g/eq; bromine content: 48%), 150.0 g of tetrabromobisphenol A (hereinafter abbreviated as TBA), 419.0 g of 2,4,6-tribromophenol (hereinafter abbreviated as TBP), and 26.0 g of stearic acid (carboxyl equivalent: 285 g/eq). After displacing the atmosphere with nitrogen gas, the contents were melted by heating, and 1.3 g of a 10% aqueous solution of sodium hydroxide was added thereto at 100° C.., followed by allowing the mixture to react at 150° to 180° C. for 12 hours. After the reaction, the reaction mixture was cast on a stainless steel pan, cooled, and ground to obtain a flame retardant as a pale yellow powder. The resulting flame retardant was designated retardant A. Retardant A had an epoxy content of $0.04 \times 10^{-3}$ eq/g, a softening point of 112° C., a bromine content of 56%, and an average degree of polymerization of 1.

EXAMPLE 2

A flame retardant powder (designated retardant B) was prepared in the same manner as in Example 1, except for changing the amounts of TBP and stearic acid to 374.0 g and 66.0 g, respectively. Retardant B had an epoxy content of 0.04 ×10$^{-3}$ eq/g, a softening point of 100° C., a bromine content of 54%, and an average degree of polymerization of 1.

EXAMPLE 3

A flame retardant powder (designated retardant C) was prepared in the same manner as in Example 1, except for changing the amount of TBP to 421.0 g and replacing stearic acid with 40.0 g of chlorinated stearic acid (chlorine content: 40% (hydrogen atoms being substituted by 5.3 chlorine atoms in average per molecule); carboxyl equivalent: 468 g/eq). Retardant C had an epoxy content of 0.04×10$^{-3}$ eq/g, a softening point of 110° C., a bromine content of 55%, a chlorine content: 1.2%, and an average degree of polymerization of 1.

EXAMPLE 4

A flame retardant powder (designated retardant D) was prepared in the same manner as in Example 1, except for changing the amount TBP to 368.0 g and replacing stearic acid with 65.5 g of palmitic acid (carboxyl equivalent: 265 g/eq). Retardant D had an epoxy content of 0.05×10$^{\times 3}$ eq/g, a softening point of 100° C., a bromine content of 54%, and an average degree of polymerization of 1.

EXAMPLE 5

A flame retardant powder (designated retardant E) was prepared in the same manner as in Example 1, except for changing the amounts of TBA, stearic acid, and 10% sodium hydroxide aqueous solution to 393.0 g, 58.6 g, and 0.4 g, respectively, and using no TBP. Retardant E had an epoxy content of 0.24×10$^{-3}$ eq/g, a softening point of 147° C., a bromine content of 49%, and an average degree of polymerization of 6.

EXAMPLE 6

A flame retardant powder (designated retardant F) was prepared in the same manner as in Example 1, except for changing the amounts of TBA, stearic acid, and 10% sodium hydroxide aqueous solution to 506.0 g, 26.0 g, and 0.3 g, respectively, using no TBP, and conducting the reaction at 150 to 230° C. for 12 hours. Retardant F had an epoxy content of 0.03×10$^{-3}$ eq/g, a softening point of 198° C., a bromine content of 51%, and an average degree of polymerization of 30.

EXAMPLE 7

A flame retardant powder (designated retardant G) was prepared in the same manner as in Example 1, except for changing the amount of TBP to 329.0 g and replacing stearic acid with 63.0 g of captic acid. Retardant G had an epoxy content of 0.05×10$^{-3}$ eq/g, a softening point of 98° C., a bromine content of 53%, and an average degree of polymerization of 1.

EXAMPLE 8

A flame retardant powder (designated retardant H) was prepared in the same manner as in Example 1, except for changing the amount of TBP to 374.0 g and replacing stearic acid with 66.0 g of montanic acid. Retardant H had an epoxy content of 0.04×10$^{-3}$ eq/g, a softening point of 101° C., a bromine content of 54%, and an average degree of polymerization of 1.

COMPARATIVE EXAMPLE 1

A flame retardant powder (designated retardant I) was prepared in the same manner as in Example 1, except for changing the amount of TBP to 450.0 g and using no aliphatic carboxylic acid. Retardant I had an epoxy content of 0.05×10$^{-3}$ eq/g, a softening point of 116° C., a bromine content of 57%, and an average degree of polymerization of 1.

COMPARATIVE EXAMPLE 2

A flame retardant powder (designated retardant J) was prepared in the same manner as in Example 1, except for changing the amounts of TBA and 10% sodium hydroxide aqueous solution to 393.0 g and 0.3 g, respectively, and using neither TBP nor aliphatic carboxylic acid. Retardant I had an epoxy content of 0.45×10$^{-3}$ eq/g, a softening point of 162° C., a bromine content of 52%, and an average degree of polymerization of 6.

COMPARATIVE EXAMPLE 3

A flame retardant powder (designated retardant K) was prepared in the same manner as in Example 1, except for changing the amounts of TBA and 10% sodium hydroxide aqueous solution to 506.0 g and 0.3 g, respectively, using neither TBP nor aliphatic carboxylic acid, and conducting the reaction at 150° to 230° C. for 12 hours. Retardant K had an epoxy content of 0.11×10$^{-3}$ eq/g, a softening point of 205° C., a bromine content of 52%, and an average degree of polymerization of 30.

PREPARATION EXAMPLE 1

To retardant I was added 69.5 g of stearic acid, and the mixture was melt mixed at 150° C. for 1 hour. The contents were cast on a stainless steel pan, cooled, and ground to obtain a pale yellow powder having a stearic acid content of 5.0% (the same long chain aliphatic carboxylic acid content as in retardant B). The resulting mixture was designated as mixture b. Mixture b had a softening point of 100° C. and a bromine content of 54%.

PREPARATION EXAMPLE 2

A powdered mixture (designated mixture f) was prepared in the same manner as in Preparation Example 1, except for using retardant K and 25.0 g of stearic acid. Mixture f had a stearic acid content of 2.0% (the same long chain aliphatic carboxylic acid content as in retardant F), a softening point of 189° C., and a bromine content of 51%.

PREPARATION EXAMPLE 3

A powdered mixture (designated mixture g) was prepared in the same manner as in Preparation Example 1, except for using retardant I and 69.5 g of captic acid. Mixture g had a captic acid content of 5.0% (the same long chain aliphatic carboxylic acid content as in retardant G), a softening point of 98° C., and a bromine content of 53%.

PREPARATION EXAMPLE 4

A powdered mixture (designated mixture h) was prepared in the same manner as in Preparation Example 1, except for using retardant I and 69.5 g of montanic acid. Mixture h had a montanic acid content of 5.0% (the same long chain aliphatic carboxylic acid content as in retardant H), a softening point of 101° C., and a bromine content of 54%.

The results of Examples 1 to 8 are shown in Table 1, those of Comparative Examples 1 to 3 in Table 2-1, and those of Preparation Examples 1 to 4 in Table 2-2, respectively.

TABLE 1

| | Example 1 | Example 2 | Example 3 | Example 4 | Example 5 | Example 6 | Example 7 | Example 8 |
|---|---|---|---|---|---|---|---|---|
| Flame Retardant Composition (g): | A | B | C | D | E | F | G | H |
| EPICLON 152 | 720.0 | 720.0 | 720.0 | 720.0 | 720.0 | 720.0 | 720.0 | 720.0 |
| TBA | 150.0 | 150.0 | 150.0 | 150.0 | 393.0 | 506.0 | 150.0 | 150.0 |
| TBP | 419.0 | 374.0 | 421.0 | 368.0 | — | — | 329.0 | 374.0 |
| Capric acid | — | — | — | — | — | — | 63.0 | — |
| Stearic acid | 26.0 | 66.0 | — | — | 58.6 | 26.0 | — | — |
| Chlorinated stearic acid | — | — | 40.0 | — | — | — | — | — |
| Palmitic acid | — | — | — | 65.5 | — | — | — | — |
| Montanic acid | — | — | — | — | — | — | — | 66.0 |
| Analytical Results: | | | | | | | | |
| Long chain aliphatic carboxylic acid content (%) | 2.0 | 5.0 | 3.0 | 5.0 | 5.0 | 2.0 | 5.0 | 5.0 |
| Average degree of polymerization | 1 | 1 | 1 | 1 | 6 | 30 | 1 | 1 |
| Epoxy content ($\times 10^{-3}$ eq/g) | 0.04 | 0.04 | 0.04 | 0.05 | 0.24 | 0.03 | 0.05 | 0.04 |
| Softening point (°C.) | 112 | 100 | 110 | 100 | 147 | 198 | 98 | 101 |
| Bromine content (%) | 56 | 54 | 55 | 54 | 49 | 51 | 53 | 54 |
| Chlorine content (%) | — | — | 1.2 | — | — | — | — | — |

TABLE 2-1

| | Compar. Example 1 | Compar. Example 2 | Compar. Example 3 |
|---|---|---|---|
| Flame Retardant Composition (g): | I | J | K |
| EPICLON 152 | 720.0 | 720.0 | 720.0 |
| TBA | 150.0 | 393.0 | 506.0 |
| TBP | 450.0 | — | — |
| Analytical Results: | | | |
| Long chain aliphatic carboxylic acid content (%) | — | — | — |
| Average degree of polymerization | 1 | 6 | 30 |
| Epoxy content ($\times 10^{-3}$ eq/g) | 0.05 | 0.45 | 0.11 |
| Softening point (°C.) | 116 | 162 | 205 |
| Bromine content (%) | 57 | 52 | 52 |
| Chlorine content (%) | — | — | — |

TABLE 2-2

| | Prepn. Example 1 | Prepn. Example 2 | Prepn. Example 3 | Prepn. Example 4 |
|---|---|---|---|---|
| Flame Retardant Mixture | b | f | g | h |
| Composition (g): | | | | |
| EPICLON 152 | 720.0 | 720.0 | 720.0 | 720.0 |
| TBA | 150.0 | 506.0 | 150.0 | 150.0 |
| TBP | 450.0 | — | 450.0 | 450.0 |
| Capric acid | — | — | 69.5 | — |
| Stearic acid | 69.5 | 25.0 | — | — |
| Montanic acid | — | — | — | 69.5 |
| Analytic Results: | | | | |
| Long chain aliphatic carboxylic acid content (%) | 5.0 | 2.0 | 5.0 | 5.0 |
| Average degree of polymerization | — | — | — | — |
| Epoxy content ($\times 10^{-3}$ eq/g) | — | — | — | — |
| Softening point (°C.) | 100 | 189 | 98 | 101 |
| Bromine content (%) | 54 | 51 | 53 | 54 |
| Chlorine content (%) | — | — | — | — |

EXAMPLES 9 TO 24 AND COMPARATIVE EXAMPLES 4 TO 15

An injection molding compound was prepared by premixing the composition shown in Tables 3 through 5 below in a tumble mixer and then pelletizing by means of a twin-screw extruder having a diameter of 30 mm at a cylinder temperature of 250° to 260° C. The compound was injection molded in a 5 oz. injection molding machine at a cylinder temperature of 250° to 260° C. to prepare test specimens.

The test results obtained are shown in Tables 3 to 5.

TABLE 3

| | Example No. | | | | | | | | | | |
|---|---|---|---|---|---|---|---|---|---|---|---|
| | 9 | 10 | 11 | 12 | 13 | 14 | 15 | 16 | 17 | 18 | 19 |
| Composition (part): | | | | | | | | | | | |
| PBT[1] | 100 | 100 | 100 | 100 | 100 | 100 | 100 | 100 | 100 | 100 | 100 |
| Flame retardant (or Mixture) | A | A | A | B | C | D | G | H | b | g | h |
| | 15 | 10 | 25 | 15 | 15 | 15 | 15 | 15 | 15 | 15 | 15 |
| Antimony trioxide[2] | 7 | 7 | 7 | 7 | 7 | 7 | 7 | 7 | 7 | 7 | 7 |
| Physical Properties: | | | | | | | | | | | |
| Heat distortion temperature (°C.) | 63 | 60 | 65 | 62 | 63 | 63 | 62 | 63 | 59 | 58 | 60 |

TABLE 3-continued

| | Example No. | | | | | | | | | | |
|---|---|---|---|---|---|---|---|---|---|---|---|
| | 9 | 10 | 11 | 12 | 13 | 14 | 15 | 16 | 17 | 18 | 19 |
| Izod impact strength (kg · cm/cm) | 3.2 | 3.4 | 2.9 | 3.4 | 3.4 | 3.4 | 3.3 | 3.5 | 3.6 | 3.4 | 3.6 |
| Flammability (UL-94) | V-0 | V-2 | V-0 | V-0 | V-0 | V-0 | V-0 | V-0 | V-0 | V-0 | V-0 |
| Thermal stability (number of molding cycles) | 145 | 160 | 131 | 175 | 142 | 168 | 177 | 168 | 132 | 129 | 135 |
| Mold releasability: | | | | | | | | | | | |
| Appearance of molded article | good | good | good | good | good | good | good | good | good | good | good |
| Max. load on release (kg/cm$^2$) | 30 | 30 | 45 | 30 | 30 | 30 | 30 | 30 | 60 | 60 | 60 |

TABLE 4

| | Comparative Example No. | | | | | | |
|---|---|---|---|---|---|---|---|
| | 4 | 5 | 6 | 7 | 8 | 9 | 10 |
| Composition (part): | | | | | | | |
| PBT[1] | 100 | 100 | 100 | 100 | 100 | 100 | 100 |
| Flame retardant | I | I | I | I | I | I | I |
| | 15 | 15 | 15 | 15 | 15 | 10 | 25 |
| Antimony trioxide[2] | 7 | 7 | 7 | 7 | 7 | 7 | 7 |
| Stearic acid | 1.0 | — | — | — | — | — | — |
| Calcium stearate | — | 1.0 | — | — | — | — | — |
| Ethylenebisstearamide | — | — | 1.0 | — | — | — | — |
| Butyl stearate | — | — | — | 1.0 | — | — | — |
| Physical Properties: | | | | | | | |
| Heat distortion temperature (°C.) | 59 | 61 | 61 | 61 | 63 | 60 | 65 |
| Izod impact strength (kg · cm/cm) | 3.6 | 3.3 | 3.2 | 3.2 | 3.2 | 3.5 | 2.9 |
| Flammability (UL-94) | V-0 | V-0 | V-0 | V-0 | V-0 | V-2 | V-0 |
| Thermal stability (number of molding cycles) | 82 | 95 | 82 | 97 | 65 | 78 | 48 |
| Mold releasability: | | | | | | | |
| Appearance of molded article | medium | medium | medium | medium | medium to poor | medium | poor |
| Max. load on release (kg/cm$^2$) | 110 | 110 | 110 | 105 | 130 | 110 | 145 |

TABLE 5

| | Ex. 20 | Compa. Ex. 11 | Ex. 21 | Ex. 22 | Compa. Ex. 12 | Compa. Ex. 13 | Ex. 23 | Ex. 24 | Compa. Ex. 14 | Compa. Ex. 15 |
|---|---|---|---|---|---|---|---|---|---|---|
| Composition (part): | | | | | | | | | | |
| PBT[1] | 100 | 100 | 100 | 100 | 100 | 100 | 50 | — | 50 | — |
| 6-Nylon[3] | — | — | — | — | — | — | — | 50 | — | 50 |
| Polycarbonate[4] | — | — | — | — | — | — | 50 | 50 | 50 | 50 |
| Flame retardant (or Mixture) | E | J | F | f | K | K | F | F | K | K |
| | 15 | 15 | 15 | 15 | 15 | 15 | 15 | 15 | 15 | 15 |
| Antimony trioxide[2] | 7 | 7 | 7 | 7 | 7 | 7 | 7 | 7 | 7 | 7 |
| Stearic acid | — | — | — | — | 1.0 | — | — | — | — | — |
| Physical Properties: | | | | | | | | | | |
| Heat distortion temperature (°C.) | 67 | 67 | 68 | 64 | 63 | 68 | 92 | 112 | 94 | 115 |
| Izod impact strength (kg · cm/cm) | 3.0 | 3.0 | 2.6 | 2.7 | 2.8 | 2.4 | 23 | 7 | 19 | 4 |
| Flammability (UL-94) | V-0 | V-0 | V-0 | V-0 | V-0 | V-0 | V-0 | V-0 | V-0 | V-0 |
| Thermal Stability (number of molding cycles) | 181 | 42 | 166 | 118 | 93 | 83 | 147 | 133 | 64 | 52 |
| Mold Releasability: | | | | | | | | | | |
| Appearance of molded article | good | poor | good | good | poor | poor | good | good | poor | poor |
| Max. load on | 35 | 150 | 45 | 80 | 145 | 180 | 45 | 55 | 180 | 210 |

TABLE 5-continued

|  | Ex. 20 | Compa. Ex. 11 | Ex. 21 | Ex. 22 | Compa. Ex. 12 | Compa. Ex. 13 | Ex. 23 | Ex. 24 | Compa. Ex. 14 | Compa. Ex. 15 |
|---|---|---|---|---|---|---|---|---|---|---|
| release (kg/cm$^2$) | | | | | | | | | | |

Note:
[1]"VALOX" produced by Nippon G.E. Plastic K.K.
[2]"ATOX-F" produced by Nihon Mining & Concentrating Co., Ltd.
[3]"ZYTEL 211" produced by E. I. du Pont de Nemours & Co. Inc.
[4]"NOVALEX" produced by Mitsubishi Chemical Industries, Ltd.

While the invention has been described in detail and with reference to specific examples thereof, it will be apparent to one skilled in the art that various changes and modifications can be made therein without departing from the spirit and scope thereof.

What is claimed is:

1. A flame-retardant thermoplastic resin composition comprising (A) a thermoplastic resin and (B-1) a halogenated epoxy resin whose epoxy groups are capped by a long chain saturated aliphatic monocarboxylic acid or (B-2) a mixture prepared by melt mixing (b1) a halogenated epoxy resin or (b2) a halogenated epoxy resin whose epoxy groups are capped with (b3) a long chain saturated aliphatic monocarboxylic acid.

2. A flame-retardant thermoplastic resin composition as claimed in claim 1, comprising (A) the thermoplastic resin and (B-1) a halogenated epoxy resin whose epoxy groups are capped by the long chain saturated aliphatic, monocarboxylic acid.

3. A flame-retardant thermoplastic resin composition as claimed in claim 1, wherein said halogenated epoxy resin (B-1) is a halogenated epoxy resin whose epoxy groups are capped by the long chain saturated aliphatic monocarboxylic acid and a halogenated phenol compound.

4. A flame-retardant thermoplastic resin composition as claimed in claim 1, wherein said long chain saturated aliphatic monocarboxylic acid contains from 10 to 30 carbon atoms.

5. A flame-retardant thermoplastic resin composition as claimed in claim 1, wherein said thermoplastic resin (A) is a polyester resin.

6. A flame-retardant thermoplastic resin composition as claimed in claim 1, wherein said thermoplastic resin (A) is a polymer alloy of a polycarbonate and a polyester resin or of a polycarbonate polyamide resin.

7. A flame-retardant thermoplastic resin composition as claimed in claim 1, wherein said composition further contains a flame retardant assistant.

* * * * *